United States Patent
Zhao et al.

(10) Patent No.: US 11,906,745 B1
(45) Date of Patent: Feb. 20, 2024

(54) DISPLAY BACKING

(71) Applicant: Apple Inc., Cupertino, CA (US)

(72) Inventors: Qianyi Zhao, Cupertino, CA (US); Runren Zhang, San Jose, CA (US); Zhenggang Cheng, Santa Clara, CA (US); Jeffrey A Griffis, San Carlos, CA (US); Stephen E Dey, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/721,255

(22) Filed: Apr. 14, 2022

Related U.S. Application Data (60) Provisional application No. 63/179,119, filed on Apr. 23, 2021.

(51) Int. Cl.
*G02B 27/01* (2006.01)
*G06F 3/01* (2006.01)

(52) U.S. Cl.
CPC .......... *G02B 27/0172* (2013.01); *G06F 3/011* (2013.01); *G02B 2027/014* (2013.01)

(58) Field of Classification Search
None
See application file for complete search history.

(56) References Cited

U.S. PATENT DOCUMENTS

| | | | |
|---|---|---|---|
| 10,859,843 B1* | 12/2020 | Tempel | G02B 27/0093 |
| 2013/0285896 A1* | 10/2013 | Lim | G06F 3/0425 |
| | | | 345/156 |
| 2022/0011819 A1* | 1/2022 | Shin | H04M 1/0268 |

* cited by examiner

*Primary Examiner* — Nicholas J Lee
(74) *Attorney, Agent, or Firm* — Robert C. Kowert; Kowert, Hood, Munyon, Rankin & Goetzel, P.C.

(57) ABSTRACT

Display backing components for head-mounted devices (HMDs) are described that reduce eddy currents in magnetic fields generated by a coil. A HMD may include a coil that is used to generate a magnetic field that may be used to track position of other devices with respect to the HMD. Display backing components, used to provide rigidity, are modified with holes or other gaps to interrupt the path of the eddy currents and reduce the interference with the magnetic field, thus improving the power efficiency of the coil and of the HMD. These modifications may be formed by casting, drilling, cutting or otherwise perforating the display backing during manufacture.

20 Claims, 8 Drawing Sheets

DISPLAY BACKING

This application claims benefit of priority to U.S. Provisional Application Ser. No. 63/179,119, entitled "Display Backing," filed Apr. 23, 2021, and which is hereby incorporated herein by reference in its entirety.

BACKGROUND

Virtual reality (VR) allows users to experience and/or interact with an immersive artificial environment, such that the user feels as if they were physically in that environment. For example, virtual reality systems may display stereoscopic scenes to users in order to create an illusion of depth, and a computer may adjust the scene content in real-time to provide the illusion of the user moving within the scene. When the user views images through a virtual reality system, the user may thus feel as if they are moving within the scenes from a first-person point of view. Similarly, mixed reality (MR) combines computer generated information (referred to as virtual content) with real world images or a real world view to augment, or add content to, a user's view of the world. The simulated environments of VR and/or the mixed environments of MR may thus be utilized to provide an interactive user experience for multiple applications, such as applications that add virtual content to a real-time view of the viewer's environment, interacting with virtual training environments, gaming, remotely controlling drones or other mechanical systems, viewing digital media content, interacting with the Internet, or the like.

SUMMARY

Embodiments of display backing components for head-mounted devices (HMDs) are described that reduce eddy currents in magnetic fields. A HMD may include a coil that is used to generate a magnetic field that may, for example, be used to detect proximity and location of other devices to the HMD. A metal display backing component may also be used in the HMD to, for example, provide rigidity. However, the display backing component may interfere with the magnetic field by forming an eddy current, thus reducing the power efficiency of the coil. Embodiments of display backing components that are modified or configured to reduce the interference with the magnetic field, for example by reducing the eddy current, thus improving the power efficiency of the coil and of the HMD.

In a metal backing plate, most of the eddy current caused by the magnetic field generated by the coil follows a loop that is more or less in same shape as the coil, around the perimeter of the backing plate. Embodiments of display backing components are described in which the eddy current loop path is interrupted by using holes or other interruptions in the metal backing plate. The eddy current wants to find the path in the backing plate that has the least conductance. Interrupting that path with holes or other gaps reduces the eddy current, and therefore the loss introduced by the eddy current will be reduced, improving the power efficiency of the coil.

Various embodiments of modifications to a display backing component in an HMD are described that may improve the power efficiency of the magnetic field generated by the coil by disrupting the eddy currents caused by the magnetic field. Generally, in embodiments, these modifications involve modifying the otherwise solid metal plate of the display backing component by forming holes, grooves or gaps in the metal. These modifications may be formed by casting, drilling, cutting or otherwise perforating the display backing during manufacture.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

"Or." When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for improving the power efficiency of head-mounted devices (HMDs) are described. Embodiments of display backing components for head-mounted devices (HMDs) are described that reduce eddy currents in magnetic fields that are, for example used to detect proximity and location of other devices to the HMD. A HMD may include a coil that is used to generate a magnetic field that may, for example, be used to detect proximity and location of other devices to the HMD. A metal display backing component may also be used in the HMD to, for example, provide rigidity. However, the display backing component may interfere with the magnetic field, for example by forming an eddy current, thus reducing the power efficiency of the coil. Embodiments of display backing components that are modified or configured to reduce the interference with the magnetic field, for example by reducing the eddy current, thus improving the power efficiency of the coil and of the HMD.

Figure 1A:
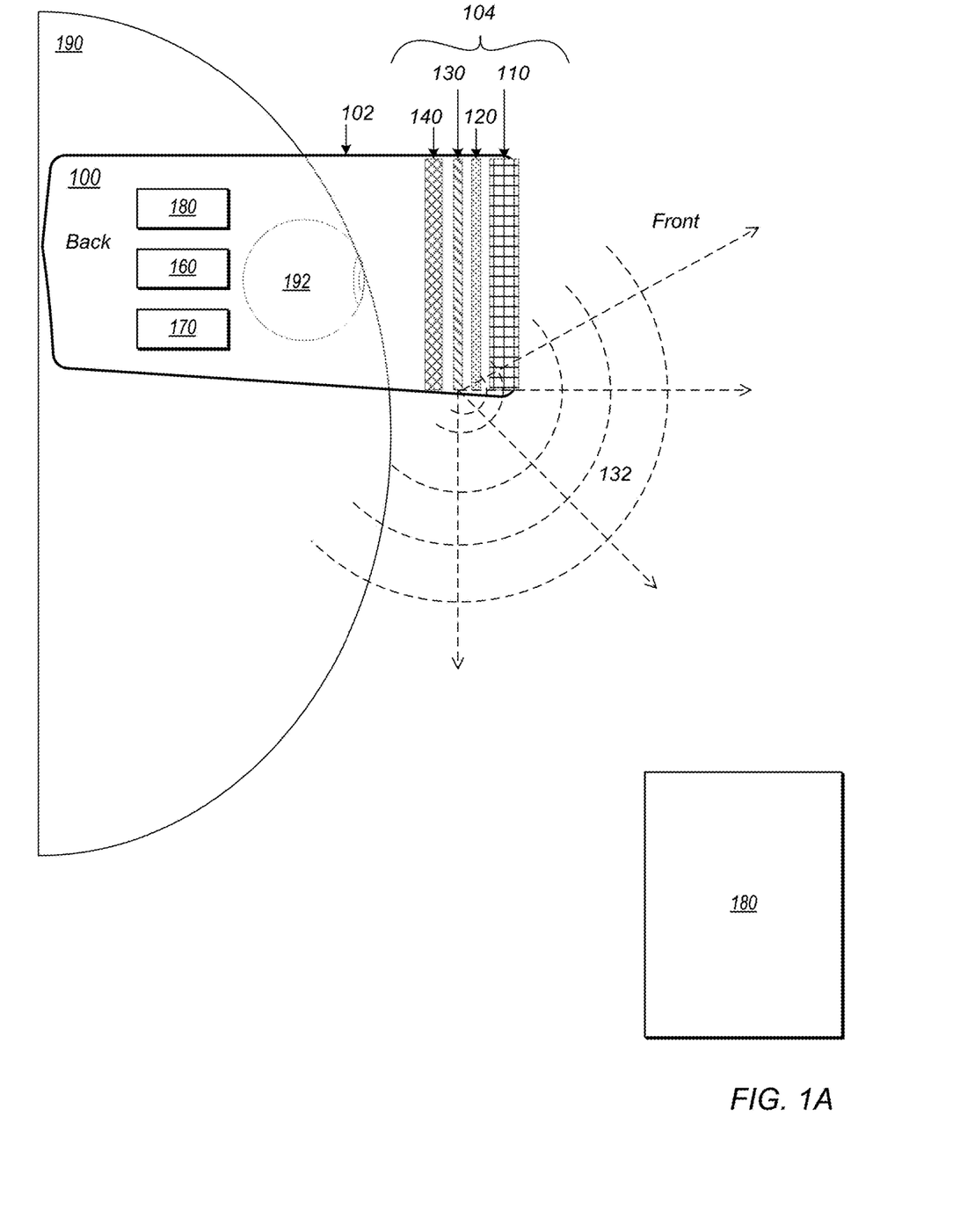
FIG. 1A illustrates an example head-mounted device (HMD) that includes a coil for generating a magnetic field and a display backing component, according to some embodiments.
Figure 1B:
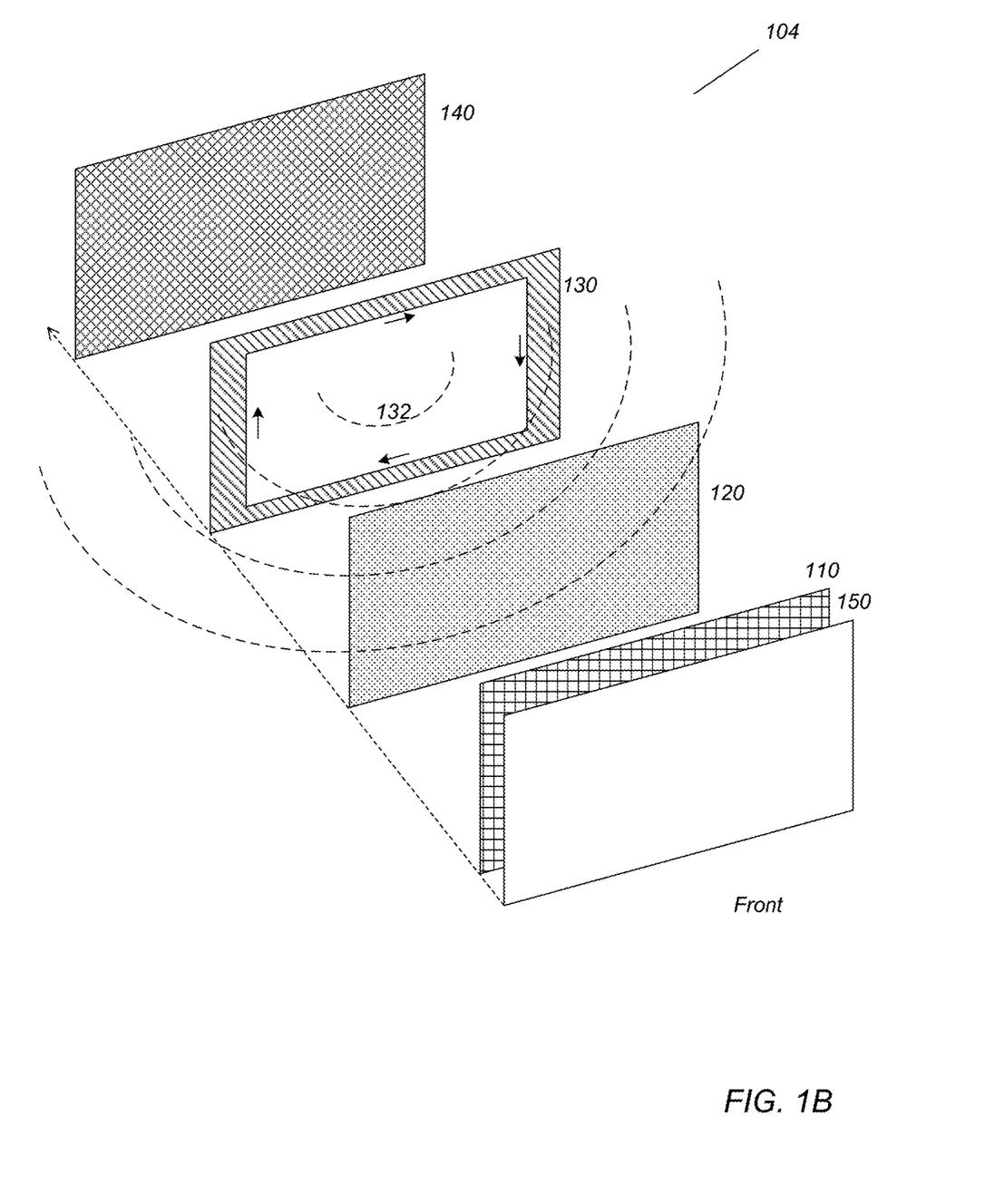
FIG. 1B graphically illustrates layers in an example HMD as illustrated in FIG. 1A, according to some embodiments.

FIGS. 1A and 1B illustrate an example head-mounted device (HMD), according to some embodiments. HMD 100 may, for example, be configured as a headset, helmet, goggles, or glasses configured to fit on a user 190's head. FIG. 1A illustrates an example HMD 100 that includes a coil for generating a magnetic field and a display backing component, according to some embodiments. FIG. 1B graphically illustrates layers in an example HMD 100 as illustrated in FIG. 1A, according to some embodiments.

Referring to FIG. 1A, a HMD 100 may include a power supply 180, a controller 160, one or more sensors 170 including but not limited to cameras, and a stack 104 comprising two or more layers of components mounted in a frame 102. Power supply 180 may, for example, be any of various types of rechargeable or replaceable power supply, and may be, but is not necessarily, internal to the HMD 100. Controller 160 may comprise one or more processors and memory. Controller 160 may include one or more of various types of processors, image signal processors (ISPs), graphics processing units (GPUs), coder/decoders (codecs), and/or other components for processing and rendering video and/or images at least in part from data collected by sensors 170. In some embodiments, the controller 160 may be integrated in the device. In some embodiments, at least some of the functionality of the controller 160 may be implemented by an external device coupled to the device by a wired or wireless connection. While not shown in FIG. 1A, in some embodiments, controller 160 may be coupled to an external memory for storing and reading data and/or software.

Embodiments of an HMD 100 as illustrated in FIG. 1A may, for example, be used in augmented or mixed (AR) applications to provide augmented or mixed reality views to the user 190. HMD 100 may include one or more sensors 170, for example located on external surfaces of the HMD 100, which collect information about the user's external environment (video, depth information, lighting information, etc.); the sensors may provide the collected information to controller 160. The sensors may include one or more visible light cameras (e.g., RGB video cameras) that capture video of the user's environment that may be used to provide the user with a virtual view of their real environment. In some embodiments, video streams of the real environment captured by the visible light cameras may be processed by the controller 160 of the HMD 100 to render augmented or mixed reality frames that include virtual content overlaid on the view of the real environment, and the rendered frames may be provided to the HMD 100's display system 110. HMD 100 may also include user-facing cameras that capture views of the user's face; the controller 160 may use this information to display views of the user's face on a world-facing display system 110, if present.

HMD 100 may implement any of various types of display technologies. For example, the HMD 100 may include a display system 140 that displays frames including left and right images on screens that are viewed by a user through eyepieces (not shown). The display system 140 may, for example, be a DLP (digital light processing), LCD (liquid crystal display), or LCoS (liquid crystal on silicon) technology display system. To create a three-dimensional (3D) effect in a 3D virtual view, objects at different depths or distances in the two images may be shifted left or right as a function of the triangulation of distance, with nearer objects shifted more than more distant objects. Note that other types of display systems may be used in some embodiments.

HMD 100 may also include one or more interfaces (e.g., a Bluetooth technology interface, USB interface, etc.) configured to communicate with one or more external devices 180 via a wired or wireless connection. In some embodiments, at least a part of the functionality described for the controller 160 may be implemented by an external device 180. The external devices 180 may be or may include any type of computing system or computing device, such as a desktop computer, notebook or laptop computer, pad or tablet device, smartphone, hand-held computing device, game controller, game system, stylus, and so on.

In various embodiments, controller 160 may be a uniprocessor system including one processor, or a multiprocessor system including several processors (e.g., two, four, eight, or another suitable number). Controller 160 may include central processing units (CPUs) configured to implement any suitable instruction set architecture, and may be configured to execute instructions defined in that instruction set architecture. For example, in various embodiments controller 160 may include general-purpose or embedded processors implementing any of a variety of instruction set architectures (ISAs), such as the x86, PowerPC, SPARC, RISC, or MIPS ISAs, or any other suitable ISA. In multiprocessor systems, each of the processors may commonly, but not necessarily, implement the same ISA. Controller 160 may employ any microarchitecture, including scalar, superscalar, pipelined, superpipelined, out of order, in order, speculative, non-speculative, etc., or combinations thereof. Controller 160 may include circuitry to implement microcoding techniques. Controller 160 may include one or more processing cores each configured to execute instructions. Controller 160 may include one or more levels of caches, which may employ any size and any configuration (set associative, direct mapped, etc.). In some embodiments, controller 160 may include at least one graphics processing unit (GPU), which may include any suitable graphics processing circuitry. Generally, a GPU may be configured to render objects to be displayed into a frame buffer (e.g., one that includes pixel data for an entire frame). A GPU may include one or more graphics processors that may execute graphics software to perform a part or all of the graphics operation, or hardware acceleration of certain graphics operations. In some embodiments, controller 160 may include one or more other components for processing and rendering video and/or images, for example image signal processors (ISPs), coder/decoders (codecs), etc.

In some embodiments, HMD 100 may include memory (not shown), such as dynamic random access memory (DRAM), synchronous DRAM (SDRAM), double data rate (DDR, DDR2, DDR3, etc.) SDRAM (including mobile versions of the SDRAMs such as mDDR3, etc., or low power versions of the SDRAMs such as LPDDR2, etc.), RAMBUS DRAM (RDRAM), static RAM (SRAM), etc. In some embodiments, one or more memory devices may be coupled onto a circuit board to form memory modules such as single inline memory modules (SIMMs), dual inline memory modules (DIMMs), etc. Alternatively, the devices may be mounted with an integrated circuit implementing system in a chip-on-chip configuration, a package-on-package configuration, or a multi-chip module configuration.

In some embodiments, the HMD 100 may be configured to render and display frames to provide an augmented or mixed reality (MR) view for the user based at least in part according to sensor inputs. The MR view may include renderings of the user's environment, including renderings of real objects in the user's environment, based on video captured by one or more video cameras that capture high-quality, high-resolution video of the user's environment for display. The MR view may also include virtual content (e.g., virtual objects, virtual tags for real objects, avatars of the user, etc.) generated by MR system and composited with the displayed view of the user's real environment.

Embodiments of the HMD 100 may also be used in virtual reality (VR) applications to provide VR views to the user. In these embodiments, the controller 160 of the HMD 100 may render or obtain virtual reality (VR) frames that include virtual content, and the rendered frames may be displayed to provide a virtual reality (as opposed to mixed reality) experience to the user.

FIG. 1B graphically illustrates layers in an example HMD 100 as illustrated in FIG. 1A, according to some embodiments. Stack 104 may include two or more layers of components. The components may include, from an outer (world-facing) layer to an inner (user-facing) layer, a cover glass 150, world-facing display 110 (optional), display backing 120, coil 130, and user-facing display 140 positioned in front of user 190's eyes 192. Note that some embodiments may include more or fewer layers. In embodiments that include a world-facing display 110, display backing 120 may be located between coil 130 and display 110, or alternatively coil 130 may be located between display backing 120 and display 110. In embodiments that do not include a world-facing display, display backing 120 may be located between coil 130 and display 140, or alternatively coil 130 may be located between display backing 120 and display 140.

Controller 160 may be configured to generate VR or AR content, based at least in part on data collected by sensors 170, which is provided to display 140 for viewing by the user 190. While not shown, HMD 100 may also include optical elements located between display 140 and the user 190's eyes 192 through which the user 190 views content presented on display 140. In embodiments that include a world-facing display 110, controller 160 may also be configured to generate digital content based at least in part on data collected by sensors 170, for example video images of the portion of the user 190's face that is obscured by the HMD 100, which is provided to display 110 for viewing by persons other than the user 190.

Display backing 120 may be a metal plate or layer that, for example, helps to provide strength and rigidity to the stack 104 of components mounted in frame 102, and thus to protect the display component(s) from flexing.

An AR or VR system that includes an HMD 100 as illustrated in FIG. 1A may also include an external or peripheral device 180 that may, for example, be held by the user 190 and used to interact with the virtual world presented by the HMD to the user 190 via display 140. As non-limiting examples, device 180 may be a game controller for entertainment applications, a pencil or stylus for creative applications, or a specialized controller for gaming or training applications. To interact with the virtual world presented to the user 190 by HMD 100, the position of the device 180 relative to the HMD 180 may need to be tracked in multiple dimensions. 6 DOF (degrees of freedom) data provided by the tracking may, for example, be used in generating additional virtual content that is tied to the peripheral device 180 in space.

To track an external device 180, HMD 100 may include a coil 130. Coil 130 may be positioned between display backing 120 and display 140. An AC current provided by power supply 180 may be run through the coil 130 to generate a magnetic field 132. The peripheral device may be configured to detect the magnetic field 132. The strength of the detected magnetic field 132 at the device 180 may then be used to determine distance of the device 180 to the HMD 100. Sensors on the device 180 and/or on the HMD 100, for example cameras and/or inertial measurement units, may be used to determine the other degrees of freedom. The 6 DOF information may then be used by the HMD 100 to, for example, tie virtual content to a current position of the device 180 in space and to track motion of the device 180 with respect to the HMD 100.

However, metal components within the HMD 100 such as the display backing 120 can generate eddy currents that reduce the efficiency of the coil 130 when generating a magnetic field 132 at a distance. Embodiments of methods and apparatus as described herein are directed to the power efficiency of the magnetic field 132 generated by the coil 130, and in particular how the display backing 120 in the HMD 100 affects the power efficiency of the magnetic field 132 generated by the coil 130.

Figure 2A:
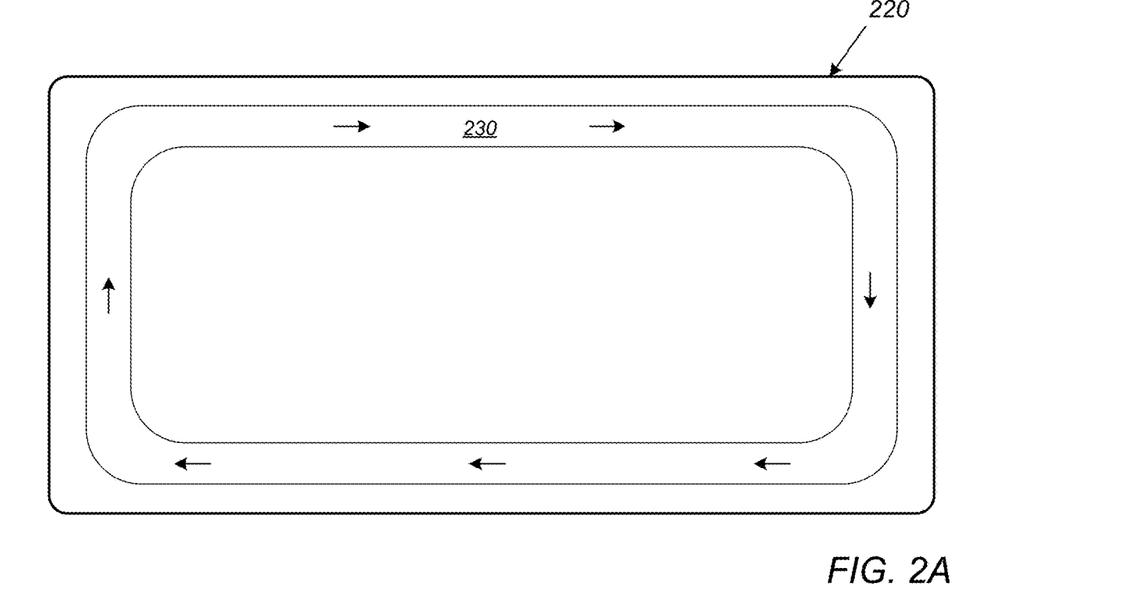
FIG. 2A illustrates an example coil and display backing component in an HMD, according to some embodiments.

FIG. 2A illustrates an example coil 230 and display backing 220 component in an HMD, according to some embodiments. Note that the shapes of coil 230 and display backing 220 are provided as an example, and are not intended to be limiting. To track an external device, an HMD may include a coil 230. In some embodiments, coil 230 may be positioned between display backing 220 and a user-facing display. An AC current provided by a power supply may be run through the coil 230 to generate a magnetic field which may, for example, be used to track a peripheral device.

Figure 2B:
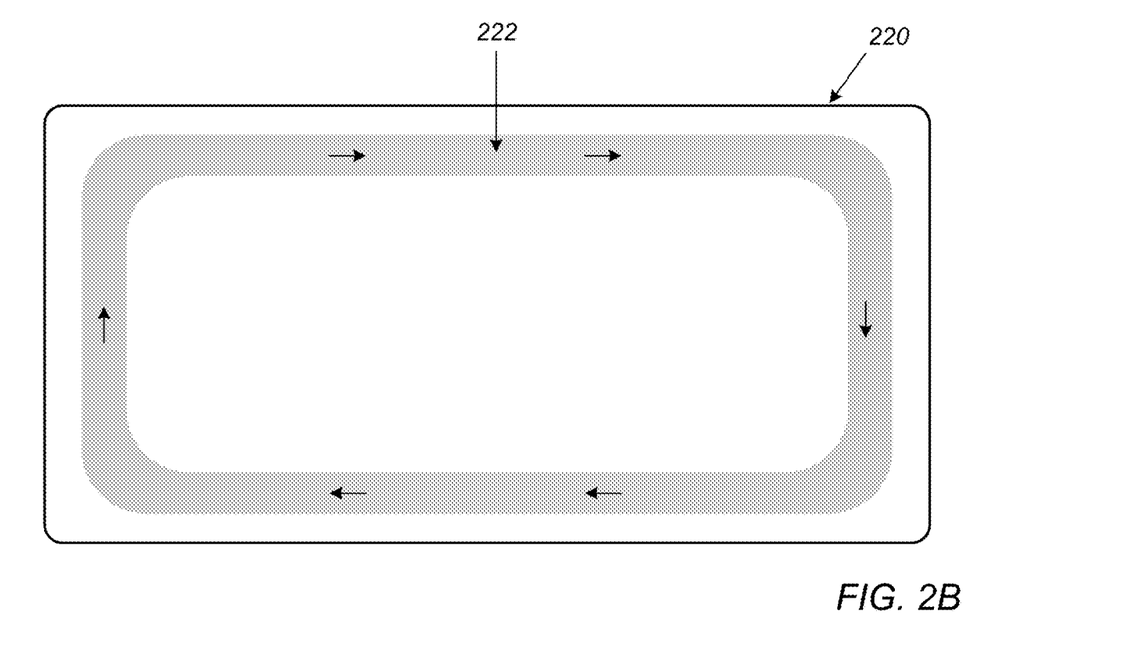
FIG. 2B illustrates an example eddy current generated by a display backing component as illustrated in FIG. 2A, according to some embodiments.

FIG. 2B illustrates an example eddy current 222 generated by a display backing 220 component as illustrated in FIG. 2A, according to some embodiments. A metal components within an HMD such as the display backing 220 can generate eddy currents 222 that reduce the efficiency of the coil 230 when generating a magnetic field at a distance.

FIGS. 3 through 6B illustrate various embodiments of modifications to a display backing component in an HMD as illustrated in FIGS. 1A through 2B that may improve the power efficiency of the magnetic field generated by the coil by disrupting the eddy currents caused by the magnetic field. Generally, in embodiments, these modifications involve modifying the otherwise solid metal plate of the display backing by forming holes, grooves or gaps in the metal. These modifications may be formed by casting, drilling, cutting or otherwise perforating the display backing during manufacture.

In the metal backing plate, most of the eddy current caused by the magnetic field generated by the coil follows a loop that is more or less in same shape as the coil, around the perimeter of the backing plate. Embodiments of backing plates as described herein interrupt the eddy current loop path by using holes or other interruptions in the metal backing plate. The eddy current wants to find the path in the backing plate that has the least conductance. Interrupting that path with holes or other gaps reduces the eddy current, and therefore the loss introduced by the eddy current will be reduced, improving the power efficiency of the coil.

Figure 3:
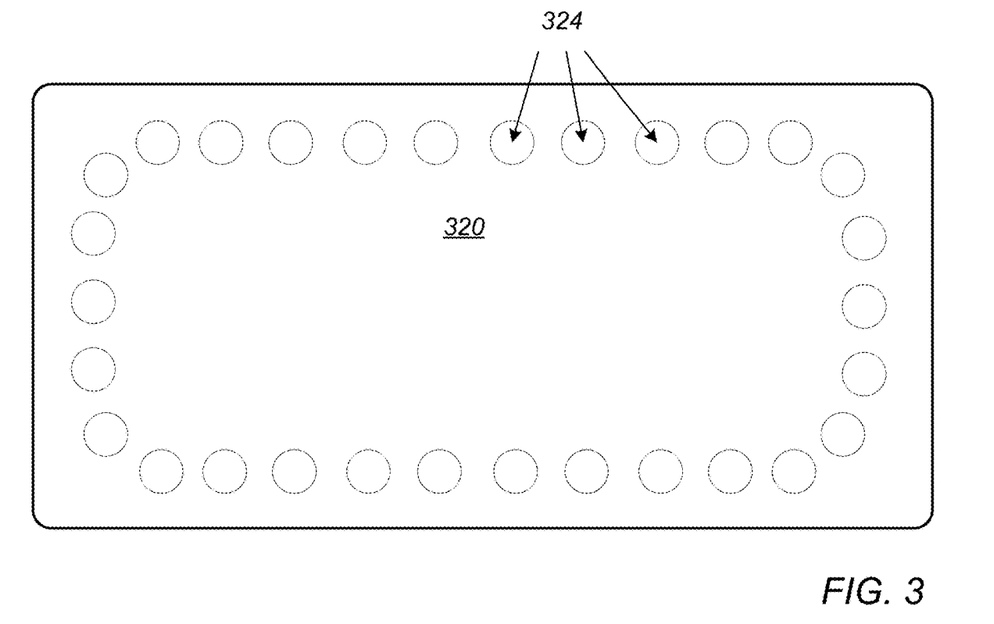
FIG. 3 illustrates small circular holes formed in a display backing component to reduce the eddy current, according to some embodiments.

FIG. 3 illustrates small circular holes 324 formed in a display backing 320 component to reduce the eddy current, according to some embodiments. These holes 324 may be formed by drilling or cutting a solid metal plate, or in the casting process, during manufacture. The holes 324 may be uniform in size, or alternatively may be of different sizes. Note that the number and arrangement of the holes 324 are given as an example, and are not intended to be limiting.

Figure 4:
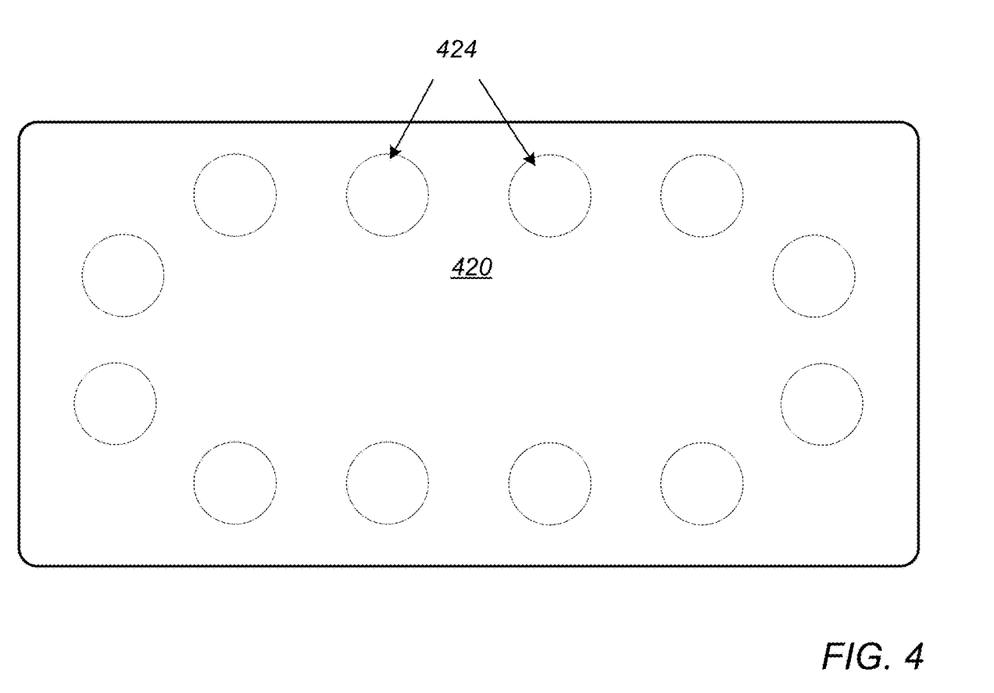
FIG. 4 illustrates large circular holes formed in a display backing component to reduce the eddy current, according to some embodiments.

FIG. 4 illustrates large circular holes 424 formed in a display backing 420 component to reduce the eddy current, according to some embodiments. These holes 424 may be formed by drilling or cutting a solid metal plate, or in the casting process, during manufacture. The holes 424 may be uniform in size, or alternatively may be of different sizes. Note that the number and arrangement of the holes 424 are given as an example, and are not intended to be limiting.

Figure 5:
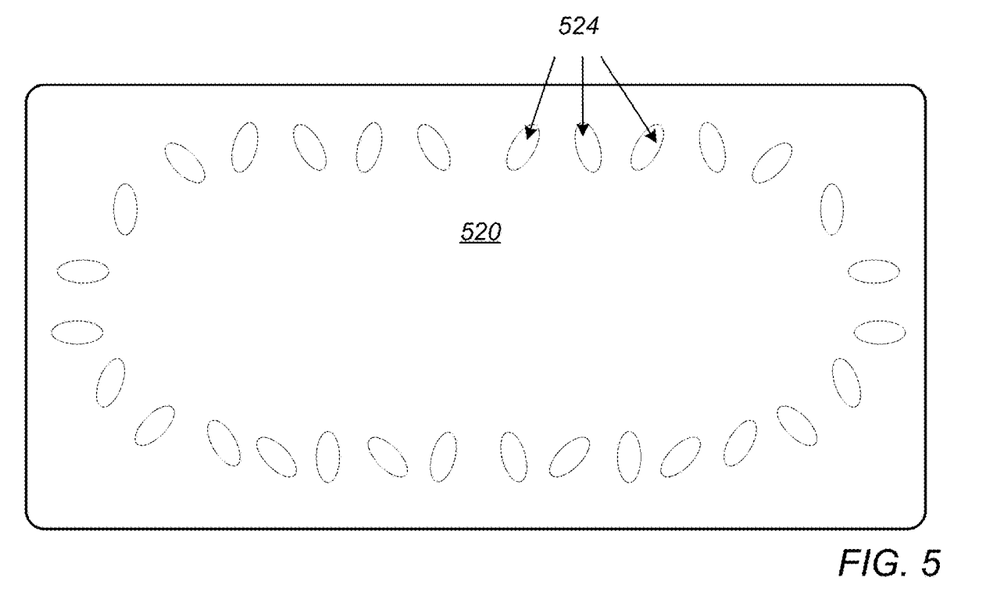
FIG. 5 illustrates oval holes formed at different orientations in a display backing component to reduce the eddy current, according to some embodiments.

FIG. 5 illustrates oval or elliptical holes 524 formed at different orientations in a display backing 520 component to reduce the eddy current, according to some embodiments. These holes 524 may be formed by drilling or cutting a solid metal plate, or in the casting process, during manufacture. The holes 524 may be uniform in size, or alternatively may be of different sizes. Note that the number and arrangement of the holes 524 are given as an example, and are not intended to be limiting.

While FIGS. 3 through 5 show examples where circular or elliptical holes are formed in a display backing component, holes of other geometric or irregular shapes (e.g., rectangles, squares, hexagons, etc.) may be used in some embodiments. Further, the patterns in which the holes are arranged are given by way of example, and the holes may be arranged in various other patterns. In addition, in some embodiments, the holes may include holes of two or more different shapes, such as circles and rectangles.

Figure 6A:
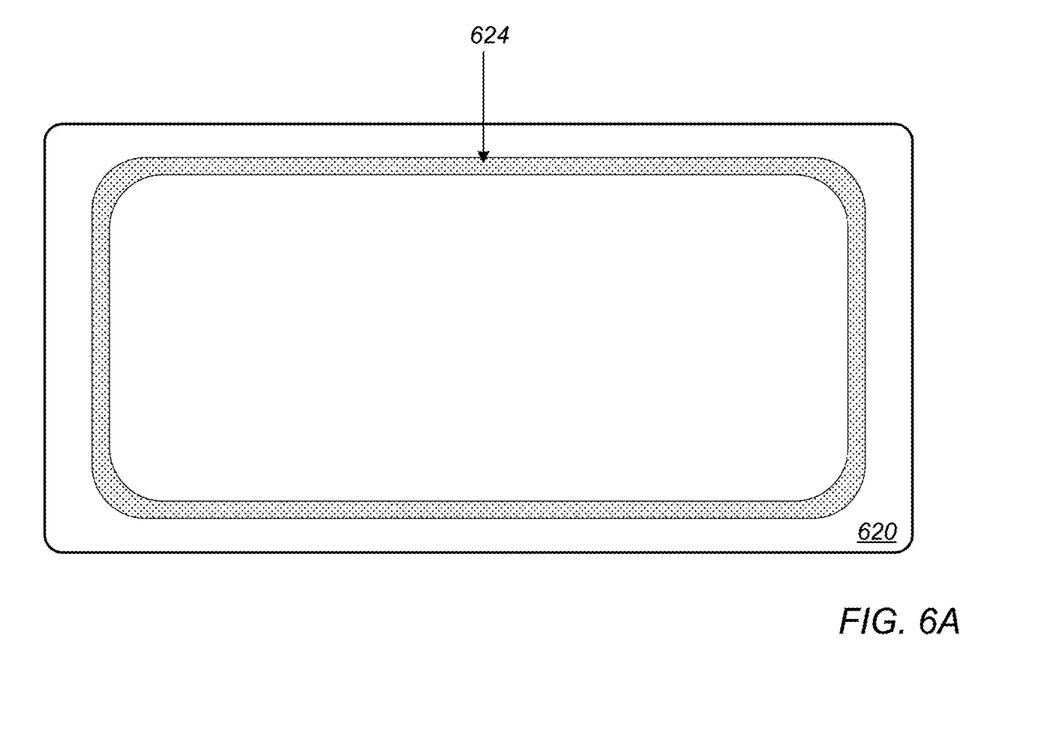
FIGS. 6A and 6B illustrates a continuous groove or gap formed in a display backing component to reduce the eddy current, according to some embodiments.
Figure 6B:
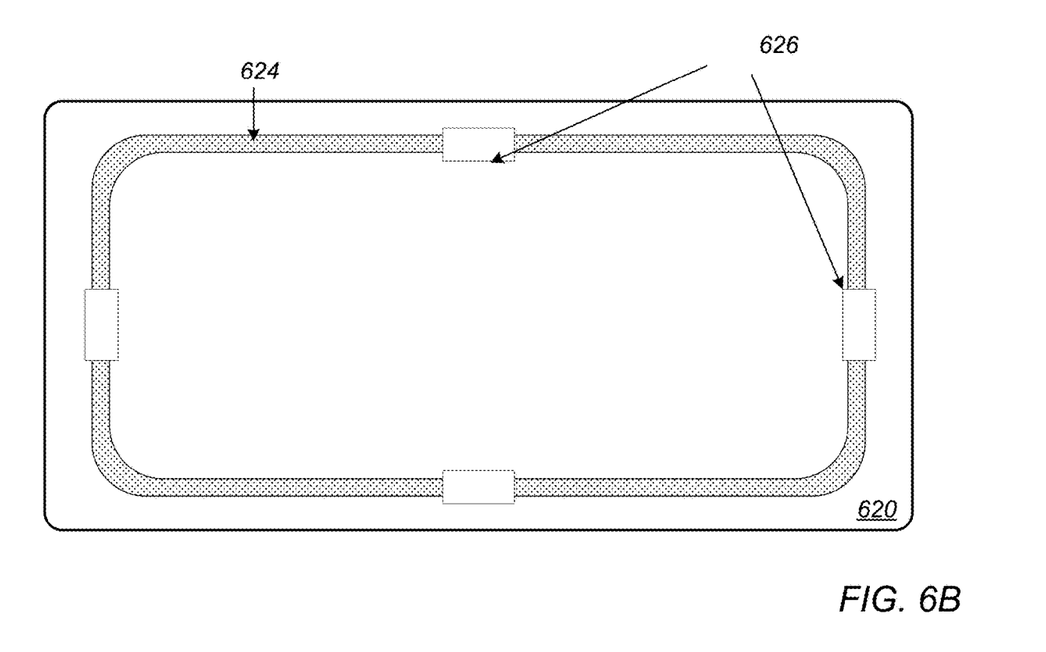

FIG. 6A illustrates a continuous groove or gap 624 formed in a display backing 620 component to reduce the eddy current, according to some embodiments. Instead of forming holes in display backing 620, a continuous gap may be formed by cutting the display backing 620 during manufacture, or alternatively the two pieces of the display backing may be formed separately during the manufacturing process. In some embodiments, the two pieces of the display backing 620 formed by the gap 624 may be connected using a non-conductive material 626 such as a plastic, polymer, or resin material to improve rigidity, as illustrated in FIG. 6B. The non-conductive material 626 may be applied at one or more locations along the gap 624 as shown in FIG. 6B, or alternatively along the entire gap 624, in various embodiments.

Figure 7:
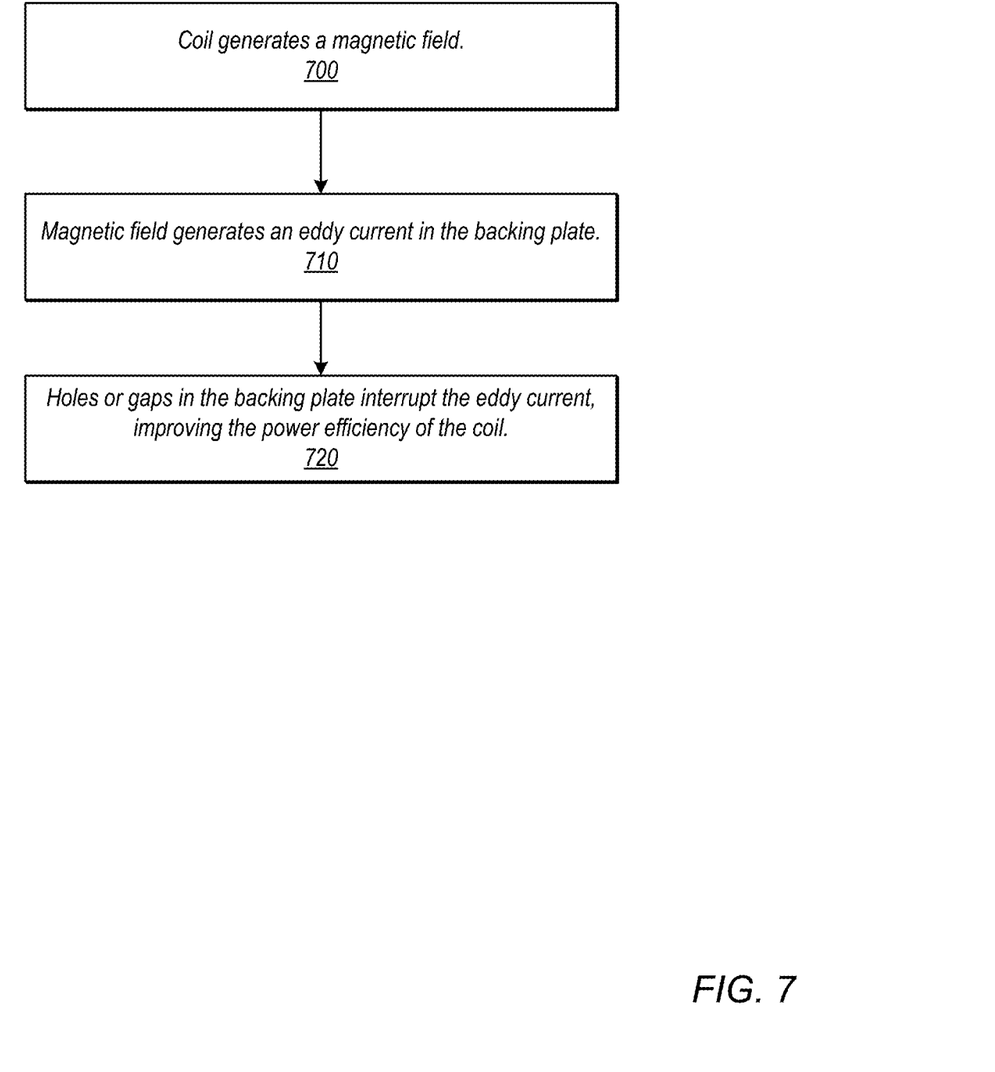
FIG. 7 is a flowchart of a method of operation of a coil in an HMD that includes a backing plate, according to some embodiments.

FIG. 7 is a flowchart of a method of operation of a coil in an HMD that includes a backing plate as described herein, according to some embodiments. As indicated at 700, a coil in the HMD generates a magnetic field that may, for example, be used in tracking the location of a peripheral device in space relative to the HMD. As indicated at 710, the magnetic field generates an eddy current in the backing plate. As indicated at 720, holes or gaps in the backing plate interfere with the eddy current, which improves the power efficiency of the coil, and improves the range at which the tracking can operate.

Design Optimization

Figure 8:
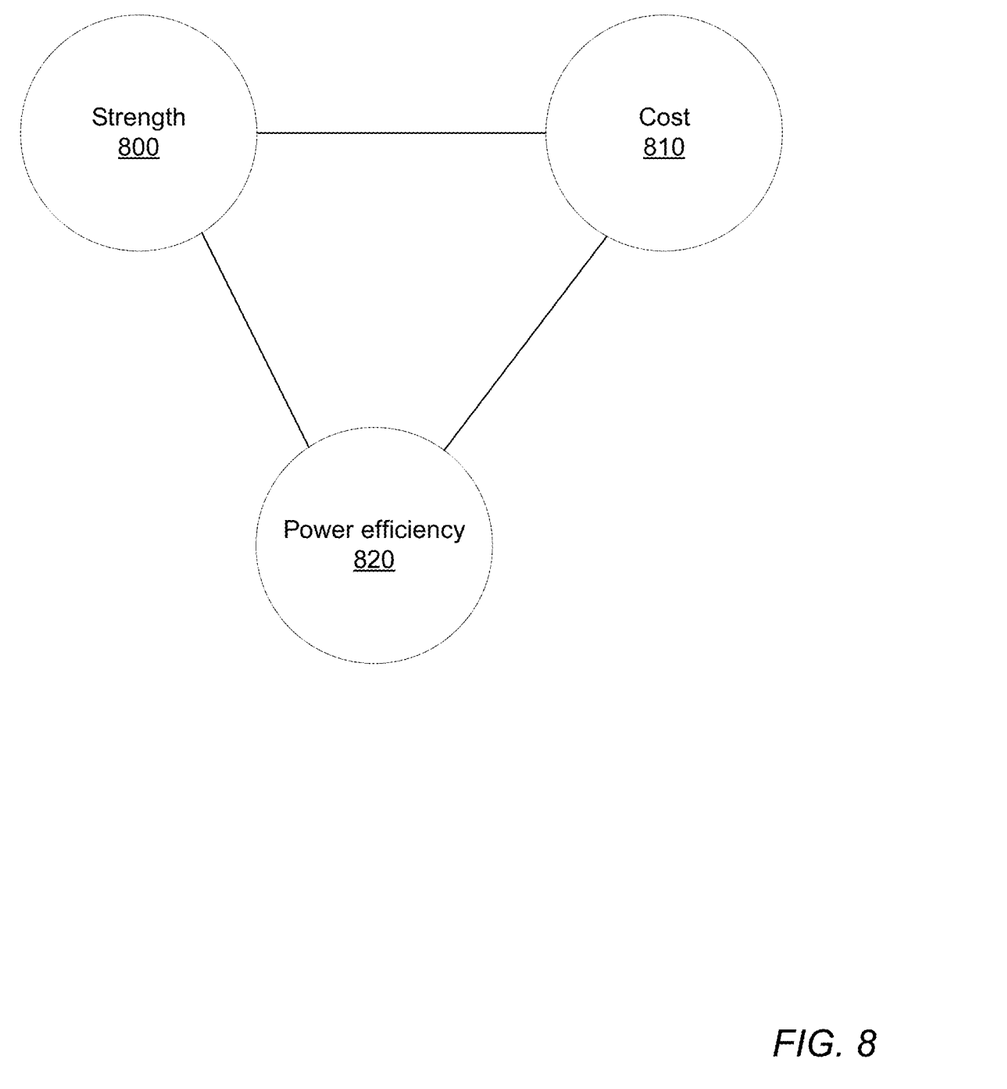
FIG. 8 graphically illustrates design optimization for a backing plate and coil, according to some embodiments.

FIG. 8 graphically illustrates design optimization for a backing plate and coil as described herein. At least three factors may be considered:

Strength 800—strength of the backing plate, which is used to provide rigidity to the HMD.

Cost 810—cost of manufacture may be a factor.

Power efficiency 820—reducing power consumption by the coil while also improving its performance in tracking peripheral devices.

When designing a backing plate for use in an HMD, at least these factors may be considered. Various configurations of holes or gaps may be tested to determine which configurations maintain a required level of strength 800 while maximizing power efficiency. Cost of manufacturing backing plates in various configurations may be considered in making a final design decision. Note that the configuration chosen may vary based on other particular design considerations.

Further note that providing holes or gaps in the backing plate may reduce weight while still providing an acceptable level of rigidity, and thus weight may also be considered as a factor in the design process.

Extended Reality

A real environment refers to an environment that a person can perceive (e.g. see, hear, feel) without use of a device. For example, an office environment may include furniture such as desks, chairs, and filing cabinets; structural items such as doors, windows, and walls; and objects such as electronic devices, books, and writing instruments. A person in a real environment can perceive the various aspects of the environment, and may be able to interact with objects in the environment.

An extended reality (XR) environment, on the other hand, is partially or entirely simulated using an electronic device. In an XR environment, for example, a user may see or hear computer generated content that partially or wholly replaces the user's perception of the real environment. Additionally, a user can interact with an XR environment. For example, the user's movements can be tracked and virtual objects in the XR environment can change in response to the user's movements. As a further example, a device presenting an XR environment to a user may determine that a user is moving their hand toward the virtual position of a virtual object, and may move the virtual object in response. Additionally, a user's head position and/or eye gaze can be tracked and virtual objects can move to stay in the user's line of sight.

Examples of XR include augmented reality (AR), virtual reality (VR) and mixed reality (MR). XR can be considered along a spectrum of realities, where VR, on one end, completely immerses the user, replacing the real environment with virtual content, and on the other end, the user experiences the real environment unaided by a device. In between are AR and MR, which mix virtual content with the real environment.

VR generally refers to a type of XR that completely immerses a user and replaces the user's real environment. For example, VR can be presented to a user using a head mounted device (HMD), which can include a near-eye display to present a virtual visual environment to the user and headphones to present a—virtual audible environment. In a VR environment, the movement of the user can be tracked and cause the user's view of the environment to change. For example, a user wearing a HMD can walk in the real environment and the user will appear to be walking through the virtual environment they are experiencing. Additionally, the user may be represented by an avatar in the virtual environment, and the user's movements can be tracked by the MID using various sensors to animate the user's avatar.

AR and MR refer to a type of XR that includes some mixture of the real environment and virtual content. For example, a user may hold a tablet that includes a camera that captures images of the user's real environment. The tablet may have a display that displays the images of the real environment mixed with images of virtual objects. AR or MR can also be presented to a user through an HMD. An HMD can have an opaque display, or can use a see-through display, which allows the user to see the real environment through the display, while displaying virtual content overlaid on the real environment.

There are many types of devices that allow a user to experience the various forms of XR. Examples include HMDs, heads up displays (HUDs), projector-based systems, smart windows, tablets, desktop or laptop computers, smart watches, earbuds/headphones, controllers that may include haptic devices, and many others. As mentioned above, an HMD, or any of the other devices listed above may include opaque displays (e.g. liquid crystal displays (LCDs), organic light emitting diode (OLED) displays or micro-LED displays) or see through displays. A see through display can have a medium through which light is directed to a user's eyes. The medium can include one or more of a waveguide, hologram medium, optical combiner, optical reflector and other optical components. An image can be generated and propagated through the medium using a display source such as OLEDs, micro-LEDs, liquid crystal on silicon (LCOS), a light scanner, digital light projection (DLP).

Devices for XR may also include audio output devices such as speakers to present audio (including spatial audio) to users, haptics devices to stimulate the user's sense of touch, and other devices to stimulate any of the user's senses. Additionally, the device may include numerous sensors, including cameras, microphones, depth sensors, eye tracking sensors, environmental sensors, input sensors, and other sensors to allow the device to understand the user and the real environment.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A head-mounted device (HMD), comprising:
   a display;
   a metal backing plate; and
   a coil;
   wherein the coil is configured to generate a magnetic field; and
   wherein the backing plate includes at least one perforation configured to reduce an eddy current in the backing plate caused by the magnetic field, wherein the at least one perforation is placed along a path of the eddy current.

2. The HMD as recited in claim 1, wherein reducing the eddy current in the backing plate improves power efficiency of the coil.

3. The HMD as recited in claim 1, wherein the magnetic field generated by the coil is configured to be detected by an external device, wherein strength of the magnetic field at the external device indicates distance of the external device to the HMD.

4. The HMD as recited in claim 1, wherein the one or more perforations include two or more holes formed in the backing plate.

5. The HMD as recited in claim 4, wherein the holes include circular holes or elliptical holes.

6. The HMD as recited in claim 4, wherein the holes are uniform in shape and size.

7. The HMD as recited in claim 4, wherein the holes include holes of two or more different geometric shapes.

8. The HMD as recited in claim 4, wherein the holes include holes of two or more different sizes.

9. The HMD as recited in claim 1, wherein the one or more perforations include a continuous gap formed in the backing plate so that the backing plate includes two separate sections.

10. The HMD as recited in claim 9, wherein the two sections of the backing plate are connected using a non-conductive material.

11. The HMD as recited in claim 10, wherein the non-conductive material is located at one or more locations along the gap.

12. The HMD as recited in claim 10, wherein the non-conductive material is located continuously along the gap.

13. The HMD as recited in claim 1, wherein the display is configured to face a user of the HMD, the HMD further comprising a world-facing display located on an opposite side of the backing plate from the coil.

14. The HMD as recited in claim 1, further comprising a cover glass located on an opposite side of the backing plate from the coil.

15. The HMD as recited in claim 1, wherein the coil is located between the display and the metal backing plate.

16. The HMD as recited in claim 1, wherein the metal backing plate is located between the display and the coil.

17. A system, comprising:
- a head-mounted device (HMD), comprising:
  - a display;
  - a metal backing plate; and
  - a coil; and
- a peripheral device;
- wherein the coil is configured to generate a magnetic field;
- wherein the peripheral device is configured to detect the magnetic field generated by the coil to estimate distance of the peripheral device to the HMD; and
- wherein the backing plate includes at least one perforation configured to reduce an eddy current in the backing plate caused by the magnetic field, wherein reducing the eddy current in the backing plate improves power efficiency of the coil, wherein the at least one perforation is placed along a path of the eddy current.

18. The system as recited in claim 17, wherein the one or more perforations include two or more holes formed in the backing plate.

19. The system as recited in claim 17, wherein the one or more perforations include a continuous gap formed in the backing plate so that the backing plate includes two separate sections.

20. A method, comprising:
- generating, by a coil in a head-mounted display (HMD), a magnetic field;
- detecting, by a peripheral device, the magnetic field generated by the coil;
- estimating position of the peripheral device relative to the HMD based at least in part on the detected magnetic field at the peripheral device; and
- causing, by the magnetic field, an eddy current in a metal backing plate of the HMD, wherein at least one perforation formed in the backing plate interferes with the eddy current caused by the magnetic field to reduce the eddy current, wherein the at least one perforation is placed along a path of the eddy current;
- wherein reducing the eddy current in the backing plate improves power efficiency of the coil.

* * * * *